US010931388B2

(12) United States Patent
Tomono

(10) Patent No.: US 10,931,388 B2
(45) Date of Patent: Feb. 23, 2021

(54) DISPLAY CONTROL DEVICE, DISPLAY CONTROL METHOD AND NON-TRANSITORY COMPUTER-READABLE MEDIUM STORING INSTRUCTIONS FOR DISPLAY CONTROL

(71) Applicant: BROTHER KOGYO KABUSHIKI KAISHA, Aichi (JP)

(72) Inventor: Keitaro Tomono, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 302 days.

(21) Appl. No.: 15/084,556

(22) Filed: Mar. 30, 2016

(65) Prior Publication Data
US 2016/0291851 A1 Oct. 6, 2016

(30) Foreign Application Priority Data

Mar. 31, 2015 (JP) ................................. 2015-072611

(51) Int. Cl.
*H04B 17/318* (2015.01)
*G06F 3/0482* (2013.01)
(Continued)

(52) U.S. Cl.
CPC ......... *H04B 17/318* (2015.01); *G06F 3/0482* (2013.01); *H04B 7/24* (2013.01);
(Continued)

(58) Field of Classification Search
None
See application file for complete search history.

(56) References Cited

U.S. PATENT DOCUMENTS 7,761,119 B2 * 7/2010 Patel .................... H04B 17/318
370/328
8,670,405 B1 * 3/2014 Lee ........................ H04W 36/24
370/331

(Continued)

FOREIGN PATENT DOCUMENTS

JP 2009-152818 A 7/2009

OTHER PUBLICATIONS

Samsung Galaxy SII. User Manual [online]. Samsung, May 31, 2013 [retrieved on Apr. 9, 2019]. Retrieved from the Internet: <URL: http://downloadcenter.samsung.com/content/UM/201310/20131021234226140/ATT_SGH-i777_Galaxy_S_II_JB_English_User_Manual_JB_MD8_F1_AC.pdf>.*

(Continued)

*Primary Examiner* — Christopher J Fibbi
(74) *Attorney, Agent, or Firm* — Scully, Scott, Murphy & Presser, P.C.

(57) ABSTRACT

A controller of a display control device is configured to display particular button images on a display, and determine whether setting in device has been set in response to receiving, from a user interface, a particular selection signal to identify a communication button image, which is one of the particular button images displayed on the display. When it is determined that the setting information has been set, the controller obtains the intensity of the radio wave detected by the detector and displays a communication-related screen corresponding to the obtained intensity of the radio wave. When it is determined that the setting information has not been set, the controller displays a particular setting screen on the display.

9 Claims, 7 Drawing Sheets

(51) Int. Cl.
*H04N 1/00* (2006.01)
*H04B 7/24* (2006.01)
*H04B 17/23* (2015.01)
*H04L 12/26* (2006.01)

(52) U.S. Cl.
CPC ............ *H04B 17/23* (2015.01); *H04L 43/16* (2013.01); *H04N 1/00204* (2013.01); *H04N 1/00411* (2013.01); *H04N 2201/0055* (2013.01); *H04N 2201/0094* (2013.01)

(56) References Cited

U.S. PATENT DOCUMENTS

| | | | | |
|---|---|---|---|---|
| 2008/0090619 | A1* | 4/2008 | Jong | H04M 1/72544 455/566 |
| 2008/0181187 | A1* | 7/2008 | Scott | H04W 48/18 370/338 |
| 2009/0164894 | A1 | 6/2009 | Takekawa et al. | |
| 2011/0103359 | A1* | 5/2011 | Cho | H04W 76/10 370/338 |
| 2011/0286437 | A1* | 11/2011 | Austin | H04W 4/02 370/338 |
| 2013/0347073 | A1* | 12/2013 | Bryksa | H04L 63/105 726/4 |
| 2015/0007075 | A1* | 1/2015 | Choi | G06F 3/0488 715/769 |

OTHER PUBLICATIONS

Download Page for Samsung Galaxy SII User Manual with Date. Download Center [online]. Samsung, May 31, 2013 [retrieved on Apr. 9, 2019]. Retrieved from the Internet: <URL: https://www.samsung.com/us/support/downloads/>.*

* cited by examiner

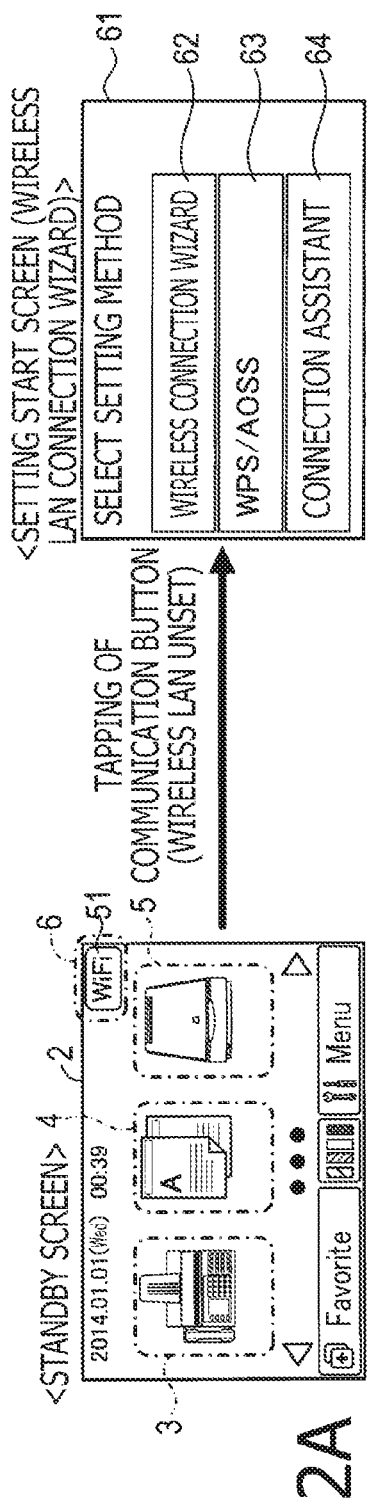
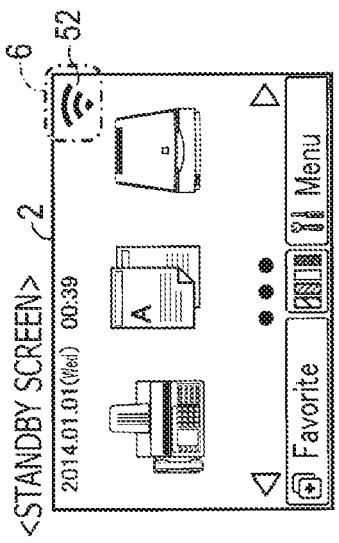
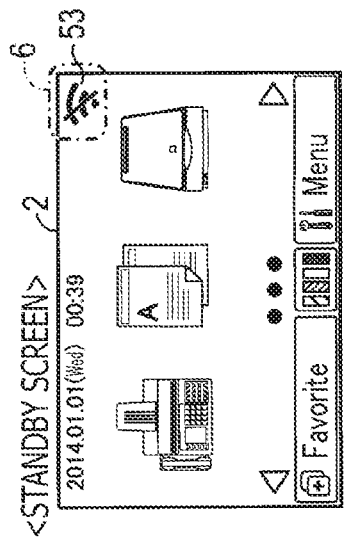
FIG. 2A
FIG. 2B
FIG. 2C

DISPLAY CONTROL DEVICE, DISPLAY CONTROL METHOD AND NON-TRANSITORY COMPUTER-READABLE MEDIUM STORING INSTRUCTIONS FOR DISPLAY CONTROL

CROSS-REFERENCE TO RELATED APPLICATION

This application claims priority under 35 U.S.C. § 119 from Japanese Patent Application No. 2015-072611 filed on Mar. 31, 2015. The entire subject matter of the application is incorporated herein by reference.

TECHNICAL FIELD

The present disclosures relate to a display control device, a display control method and a non-transitory computer-readable medium storing instructions which cause a computer to execute the display control method.

RELATED ART

In an MFP (Multi-Function Peripheral) having multiple functions, in order to use the respective functions, the user is required to perform a setting work for each of the multiple functions. Recently, the MFP having a display device provided with a touch panel has been widely used. In such an MFP, the user can easily perform the setting work with use of the touch panel.

In a generally used MFP, a standby screen may be initially displayed on the display device. When the user selects a particular image (i.e., an image of a particular button) within the standby screen through the touch panel, a screen may change from the standby screen to a lower-layer screen for a setting work.

Recent MFP's are generally provided with a data communication function to exchange data with external devices with use of wireless LAN (Local Area Network). In order to use the wireless LAN, the user is required to perform, in advance, the setting work including setting of an access point. When the setting work for the wireless LAN is performed the user, for example, selects a particular communication button on the standby screen through the touch panel. Then, the screen changes to a wireless LAN setting screen, and the user can perform the setting work on the wireless LAN setting screen.

SUMMARY

It is not always convenient if the MFP is configured such that the screen changes to the communication setting screen when the communication button is selected regardless whether the wireless LAN setting has already been performed or not. In another situation, although the wireless LAN setting has already been done, depending on a radio wave environment or other factors, the wireless LAN of which setting has already been done may not be used. In such a case, the user may select the communication button for setting work, and attempt to check or change the wireless LAN setting without knowing causes of unavailability of the wireless LAN. Such a setting work would be troublesome and is not convenient for the user.

Aspects of the disclosures provide an improved display control device which is configured such that, even if the user performs the same input operation (e.g., selection of the communication button on the displayed screen), appropriate information is provided to the user depending on a setting condition of the wireless communication, the radio wave environment and the like. The disclosures also provide an improved display control method used in the improved display control device and a non-transitory computer-readable medium storing instructions which cause a computer to execute such an improved method.

According to aspects of the disclosures, there is provided a display control device, which has a wireless communication interface configured to execute a wireless communication with an external device, a detector configured to detect an intensity of a radio wave received by the wireless communication interface, a display, a user interface configured to output a selection signal to identify a part of an image displayed on the display based on a user's operation to the user interface, and a controller. The controller is configured to execute displaying particular button images on the display, and in response to receiving, from the user interface, a particular selection signal to identify a communication button image, which is one of the particular button images displayed on the display, determining whether setting information necessary to execute the wireless communication by the wireless communication interface has been set. When it is determined that the setting information has been set, the controller executes obtaining the intensity of the radio wave detected by the detector and displaying a communication-related screen corresponding to the obtained intensity of the radio wave. When it is determined that the setting information has not been set, the controller executes displaying a particular setting screen on the display.

According to aspects of the disclosure, there is also provided a display control method to be employed in a communication device which comprises a wireless communication interface configured to execute a wireless communication with an external device, a detector configured to detect an intensity of a radio wave received by the wireless communication interface, a display, and a user interface configured to output a selection signal to identify a part of an image displayed on the display. The method includes a button display step to display particular button images on the display, and a wireless setting determination step, in response to receiving, from the user interface, a particular selection signal to identify a communication button image, which is one of the particular button images displayed on the display, to determine whether setting information necessary to execute the wireless communication by the wireless communication interface has been set. When it is determined, in the wireless setting determination step, that the setting information has been set, the method executes an intensity obtaining step to obtain the intensity of the radio wave detected by the detector and a first screen display step to display a communication-related screen corresponding to the intensity of the radio wave obtained by the intensity obtaining step. When it is determined, in the wireless setting determination step, that the setting information has not been set, the method executes a second screen display step to display a particular setting screen on the display.

According to aspects of the disclosure, there is provided a non-transitory computer-readable medium of a communication device which comprises a wireless communication interface configured to execute a wireless communication with an external device, a detector configured to detect an intensity of a radio wave received by the wireless communication interface, a display, device user interface configured to output a selection signal to identify a part of an image displayed on the display, and a controller. The non-transitory computer-readable medium stores instructions which, when executed by the controller, causes the communication device to execute displaying particular button images on the display device, and in response to receiving, from the user interface, a particular selection signal to identify a communication button image, which is one of the particular button images displayed on the display, determining whether setting information necessary to execute the wireless communication by the wireless communication interface has been set. When it is determined that the setting information has been set, the instructions cause the communication device to execute obtaining the intensity of the radio wave detected by the detector, and displaying a communication-related screen corresponding to the obtained intensity of the radio wave. When it is determined, that the setting information has not been set, the instructions cause the communication device to execute displaying a particular setting screen on the display.

BRIEF DESCRIPTION OF THE ACCOMPANYING DRAWINGS

FIGS. 2A-2C illustrate a standby screen and a setting start screen.

DETAILED DESCRIPTION OF ILLUSTRATIVE EMBODIMENT

(1) General Description on Image Processing System

Figure 1:
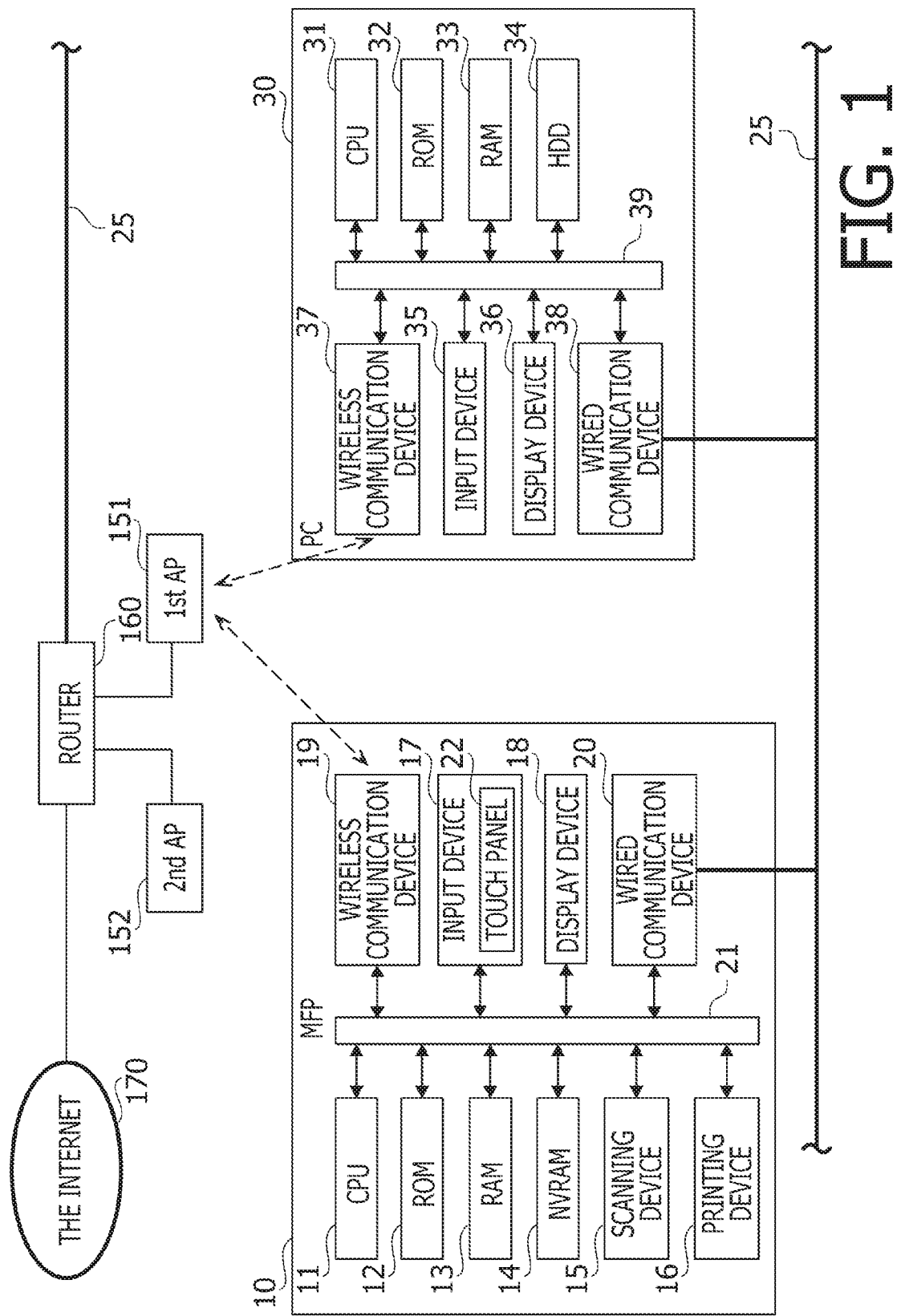
FIG. 1 is a block diagram schematically showing a configuration of an image processing system according to an illustrative embodiment of the disclosures.

An image processing system according to an illustrative embodiment has, as shown in FIG. 1, an MFP (Multi-Function Peripheral) 10, a PC (Personal Computer) 30, a first AP (Access Point) 151, a second AP (Access Point) 152 and a router 160. The first AP 151 and the second AP 152 are connected to the router 160. The MFP 10 and the PC 30 are connected to the router 160 through a LAN cable 25. The router 160 is connected to the Internet 170.

Each of the MFP 10 and the PC 30 has a data communication function through each of a wired LAN and a wireless LAN. The wired LAN is a wired communication network configured by the LAN cable 25 and devices connected to the LAN cable 25. According to the illustrative embodiment, the wireless LAN is a wireless communication network using radio waves of 2.4 GHz (gigahertz) band or 5 GHz band in accordance with IEEE 802.11 b/g/n standard.

The first AP 151 and the second AP 152 are relaying devices which relay wireless signals (i.e., radio waves) received from/transmitted to devices joining the wireless LAN. Different channels received/transmitted in the AP's 151 and 152 are set for respective AP's, thereby the AP's 151 and 152 configure different wireless LAN's.

The data communication between the MFP 10 and the PC 30 through the wireless LAN can be executed using the first AP 151 or the second AP 152. For example, when the user intends to use the wireless LAN through the first AP 151 (hereinafter, which will be called as a first wireless LAN), by performing the setting work necessary for the first wireless LAN, the user can use the same.

Further, the MFP 10 and the PC 30 can be connected to the Internet 170 through the router 160 with use of the wireless LAN or the wired LAN, and execute the data communication with other devices which are also connected to the Internet.

(2) Description on MFP 10

The MFP 10 according to the illustrative embodiment has multiple functions such as a scanning function, a copying function, a printing function and the like. The scanning function is a function of scanning an image on an original sheet and generate image data representing the image on the original sheet. The image data thus generated can be transmitted to another device (e.g., PC 30) with use of the wireless LAN or the wired LAN. The copying function is a function of printing the image which is obtained with use of the scanning function on a printing sheet. The printing function is a function of printing various types of image data such as image data transmitted from the PC 30 or another device, or image data input through various types of recording medium.

The MFP 10 has a CPU (Central Processing Unit) 11, a ROM (Read Only Memory) 13, a RAM (Random Access Memory) 14, an NVRAM (Non-Volatile RAM) 14, a scanning device 15, a printing device 16, an input device 17, a display device 18, a wireless communication device 19 and a wired communication device 20.

The CPU 11 controls components of the MFP 10 and executes various calculations in accordance with programs stored in the ROM 12 and/or NVRAM 14. The RAM 13 is used as a main memory which can be directly accessed by the CPU 11. The NVRAM 14 is an electrically rewritable non-volatile memory, and stores various pieces of setting information for the MFP 10. Among various pieces of setting information necessary for using the wireless LAN and the wired LAN, information to be set by a setting input operation by the user is stored in the NVRAM 14. A communication control program shown in FIGS. 5-7 and described later is stored in the RAM 12 or the NVRAM 14.

The scanning device 15 has an image sensor, scans an image on an original sheet with the image sensor, and generates image data representing the scanned image. The printing device 16 has a function of printing various types of image data including the image data generated by the scanning device 15 on a printing sheet. The input device 17 is an device receiving a user's inputting operation. The input device 17 according to the illustrative embodiment has a various inputting units such as a touch panel 22 and operation keys (not shown). The display device 18 has a display (e.g., an LCD: Liquid Crystal Device) capable of displaying information. It is noted that the touch panel 22 is overlaid on an image displaying area of the display device 18. That is, the touch panel 22 and the display device 18 constitute a touchscreen.

The wireless communication device 19 serves as an interface to execute the data communication using the wireless LAN. The wireless communication device 19 has an antenna (not shown) to receive/transmit a radio wave for the wireless LAN. Various types of data for the wireless LAN are transmitted/received wirelessly through the wireless communication device 19.

The wireless communication device 19 has a function of detecting RSSI (Received Signal Strength Indication) indicating the intensity of the received radio wave. The RSSI is detected for each channel of the received signal. That is, it is possible that the radio wave intensity of the signal received from the first AP 151 and the radio wave intensity of the signal received from the second AP 152 can be detected separately. The CPU 11 is capable of obtaining the RSSI detected by the wireless communication device 19, and detecting the radio wave intensity of the received signal based on the obtained RSSI.

The wired communication device 20 serves as an interface to execute a data communication through the wired LAN. The CPU 11 is configured to obtain information on whether the LAN cable 25 is connected to the wired communication device 20 and the wired communication device 20 is in a state of executing the data communication, through the wired LAN from the wired communication device 20.

The MFP 10 according to the illustrative embodiment is configured such that the wireless LAN can be used simply by connecting the LAN cable 25 with the wired communication device 20, and it is basically unnecessary for the user to perform the setting input operation regarding the wired LAN. It is noted that, in order to execute the data communication through the wired LAN with the PC 30 and/or other devices, drives and/or other software should be installed in the PC 30 and/or other devices in advance, depending on necessity.

In order to execute the data communication through the wireless LAN, it is necessary to make a setting, for each access point, to use the wireless LAN through the access point. That is, in order to use the first wireless LAN through the first AP 151, various settings enabling the wireless communication through the first AP 151 should be made in advance. Similarly, in order to use a wireless LAN through the second AP 152 (hereinafter, also called as a second wireless LAN), various settings enabling the wireless communication through the second AP 152 should be made in advance.

The MFP 10 according to the illustrative embodiment, the setting that enables usage of the wireless LAN (hereinafter, also referred to as a wireless LAN setting) can be made by selecting one of multiple setting methods, which include a WPS (Wi-Fi Protected Setup, and Wi-Fi is a registered trademark), AOSS (AirStation One-Touch Secure System, and AOSS is a registered trademark), and the like.

In order to perform the wireless LAN setting, it is necessary to display a setting start screen 61 on the display device 18 as shown in FIG. 2A. By causing the display device 18 to display the setting start screen 61, a series of setting procedures for the wireless LAN starting from the setting start screen 61 (hereinafter, referred to as a wireless LAN connection wizard) can be executed, which enables the user to complete the wireless LAN setting.

On the setting start screen 61, multiple buttons respectively representing concrete methods of the wireless LAN setting to be selected by the user are displayed. For example, the multiple buttons include a wireless connection wizard button 62, a WPS/AOSS button 63 and a connection assistant button 64.

By depressing the wireless connection wizard button 62, the user can proceed to a manual setting. It is noted that the term "depress" is used to describe a situation that a portion of the touch panel 22 is tapped by the user. For example, when it is described that the wireless connection wizard button 62 is depressed, it actually means a portion of the touch panel 22 corresponding to the wireless connection wizard button 62 displayed on the display device 18 is tapped by the user. According to the illustrative embodiment, when the wireless connection wizard button 62 is depressed, a screen asking whether the wireless LAN is used as a target network is displayed. The user can select one of the wired LAN and the wireless LAN as a network connection method through the screen. When the wireless LAN is selected as the network connection method, the wireless LAN is set to be used for data communication with external devices. When the wireless LAN is not selected as the network connection method (i.e., the wired LAN is selected as the network connection method), the wired LAN is set to be the network to be used for data communication with external devices.

According to the illustrative embodiment, in an initial status which is a factory-shipment status, the network connection method is set to the wireless LAN. It is noted that the network connection method can be changed any time, when the user wants, on a not-shown setting screen which is different from the setting start screen 61 above.

After the wireless connection wizard button 62 is depressed, when the user selects the wireless LAN on the screen indicating the user to select a network connection method, screens for various settings such as a screen for setting the SSID (Service Set IDentifier) of the AP the user wishes to use, a screen for setting an encryption key corresponding to the AP the user wishes to use, and the like sequentially. As the user performs necessary input operations following indications/instructions displayed on the screens, the wireless LAN through the user-designated SSID as the network connection method is set, and the wireless LAN via the AP can be used.

When the user depresses the WPS/AOSS button 63 on the setting start screen 61, the user can proceed to a setting using the WPS or AOSS. For example, when the user depresses the WPS/AOSS button 63, similar to a case where the wireless connection wizard button 62 is depressed, a screen asking the user whether the wireless LAN is to be used as the network connection method, and the user can set whether the wireless LAN is to be used on this screen.

When the user selects the wireless LAN as the connection method, another screen is displayed for user to select the WPS or the AOSS. The user can select one of the WPS and the AOSS on the screen.

It is noted that the WPS (Wi-Fi Protected Setup) is a function enabling a connection setting and a security setting (e.g., SSID, encryption key etc.) of the wireless LAN device easily. When both the AP and the MFP 10 are compliant with the WPS, by depressing particular buttons on both sides (i.e., on the AP side and the MFP 10 side), it becomes basically possible that the MFP 10 can use the wireless LAN through the AP.

The AOSS also is a function enabling an easy setting regarding the connection and securing for wireless devices, similar to the WPS. When both the AP and MFP 10 are compliant with the AOSS, by depressing particular setting buttons on both sides, it becomes basically possible that the MFP 10 can use the wireless LAN through the AP.

On the screen indicating the user to select the WPS or the AOSS, when the user selects the WPS or the AOSS, the user can make a wireless LAN setting in accordance with the selected one of the WPS or the AOSS.

(3) Description on PC 30

The PC 30 has a CPU 31, a ROM 32, a RAM 33, and an HDD (Hard Disk Drive) 34, an input device 35, a display device 36, a wireless communication device 37, and a wired communication device 38.

The CPU 31 executes various programs stored in the ROM 32 and/or HDD 33 to control respective components of the PC 30 and external devices (including the MFP 10). The ROM 32 stores the programs to be executed by the CPU 31 and data to be used when the programs are executed and the like. The RAM 33 serves as a main storing device when the CPU 31 executes various processes. On the HDD 34, an OS (Operating System), device drivers, and various pieces of application software are installed. The input device 35 has a keyboard and pointing devices such as a mouse. The display device 36 has an LCD (Liquid Crystal Display), an organic EL (ElectroLuminescence) display or the like.

The wireless communication device 37 is, similar to the wireless communication device 19 of the MFP 10, a wireless communication interface for the data communication through the wireless LAN. The wired communication device 38 is, similar to the wired communication device 20 of the MFP 10, a wired communication interface for the data communication through the wired LAN.

(4) General Description on Transition of Screens Regarding Network Connection

Transition of screens displayed on the display device 18 when a network connection status is displayed and/or various settings necessary for a network connection on the MFP 10 side will be described, referring to FIGS. 2-4.

When the MFP 10 is powered on and an initial process is completed, a standby screen 2 as shown in FIG. 2A is displayed on the display device 18. In the standby screen 2, multiple main function buttons 3, 4 and 5 are displayed. In the example shown in FIG. 2, a facsimile button 3, a copy button 4 and a scanner button 5 are displayed. The type of the main function buttons displayed on the display device 18 can be switched by a particular operation with respect to the touch panel 22 (e.g., a flick operation in a right-left direction). When the user depresses one of the main function buttons 3, 4 and 5, an operation status of the MFP 10 proceeds to a next step to execute the corresponding main function.

In the standby screen 2, a communication button is displayed in a communication status display area 6. The types of the communication button displayed within the communication status display area 6 are different depending on a setting status and/or a connecting status of the network. According to the illustrative embodiment, as shown in FIGS. 2A, 2B and 2C, one of a first communication button 51, a second communication button 52 and a third communication button 53 is displayed.

The first communication button 51 displayed on the standby screen 2 shown in FIG. 2A is a communication button which is displayed when the wired LAN is not set as the network connection method, and the wireless LAN setting necessary for using the wireless LAN has not been done. By depressing the first communication button 51, the setting start screen 61 is displayed on the display device 18. The setting start screen 61 is, as mentioned before, the screen indicating the user to make a wireless LAN setting necessary to use the wireless LAN, that is the setting start screen 61 is the start of the wireless LAN setting wizard. The user makes use of the setting start screen 61 as the starting point and make necessary wireless LAN setting to use a desired wireless LAN (i.e., the desired AP).

The second communication button 52 displayed on the standby screen 2 shown in FIG. 2B is a communication button which is displayed when the wireless LAN is set as the network connection method, and the wireless LAN setting has already been performed. It is noted that the second communication button 52 also indicates a radio wave intensity of the received radio wave, and the appearance depends of the radio wave intensity.

The third communication button 53 displayed on the standby screen 2 shown in FIG. 2C is a communication button displayed when the wired LAN is set as the network connection method. When the third communication button 53 is depressed, different screens are displayed depending on the connection condition of the wired LAN and/or the network environment. That is, as shown in FIG. 3, when the MFP 10 is connected to the wired LAN when the third communication button 53 is depressed, that is, the LAN cable 25 is connected to the MFP 10, a wired LAN status screen 66 is displayed.

Figure 3:
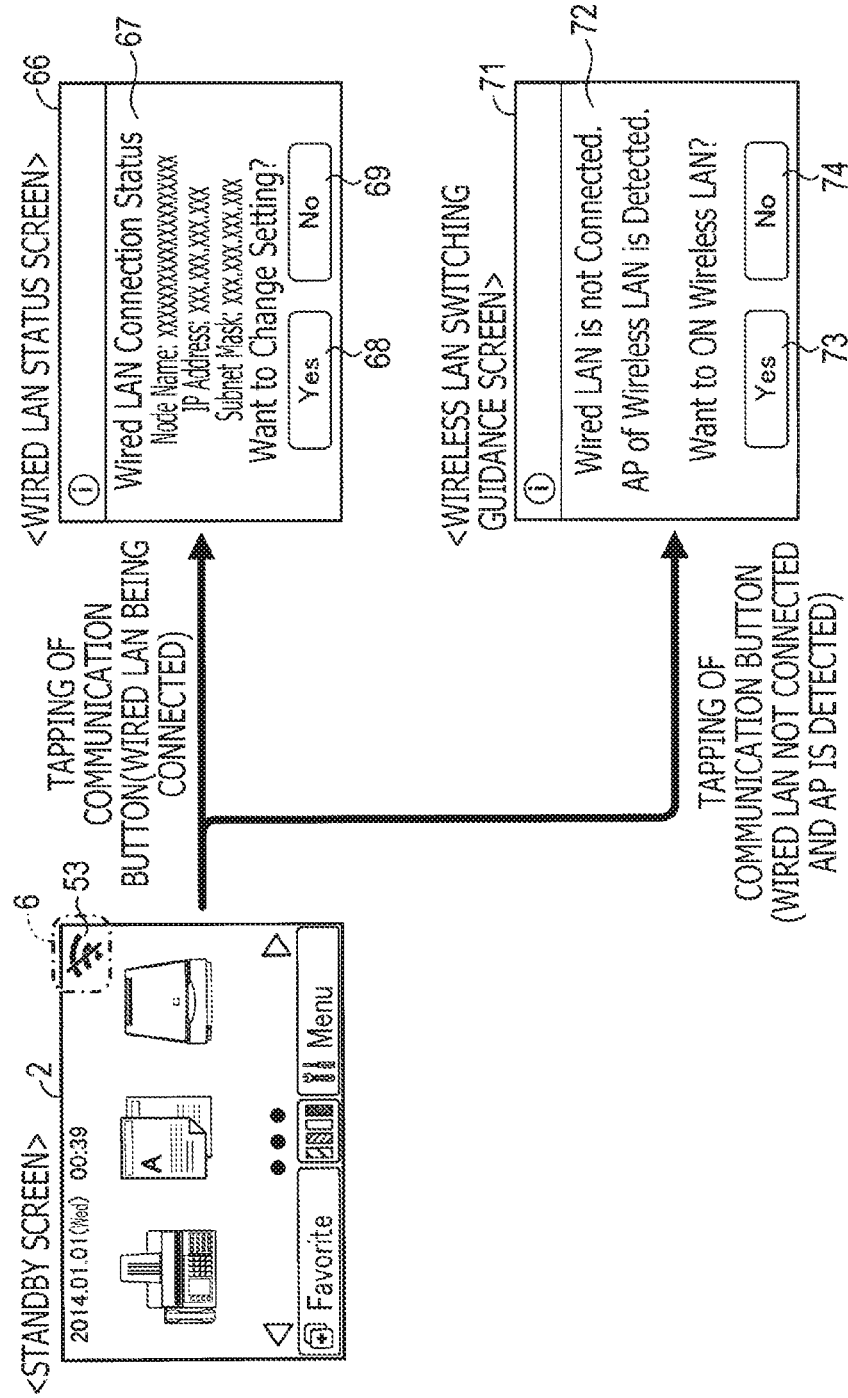
FIG. 3 illustrates a transition of displayed screens in response to depression of a communication button when a network connection method is set to a wired LAN.

On the wired LAN status screen 66, wired LAN connection information 67, a "Yes" button 68 and a "No" button 69 are displayed (see FIG. 3). The wired LAN connection information 67 is information relating to the wired LAN currently connected. For example, the wired LAN connection information 67 includes a node name and an IP address of the MFP 10, and a subnet mask. The wired LAN connection information 67 also includes a message asking whether the user wishes to change the setting information regarding the wired LAN.

When the user wishes to change the setting information of the wired LAN, the user depresses the "Yes" button 68. In such a case, the screen changes to another screen though which the user can change the setting information of the wired LAN. When the user depresses the "No" button, the screen returns to the standby screen 2.

As shown in FIG. 3, when the third communication button 53 is depressed in a state where the MFP 10 is not connected to the wired LAN (i.e., the LAN cable is not connected to the MFP 10), and further, the MFP 10 has detected the AP corresponding to the wireless LAN of which setting has been completed, that is, when the radio wave from the AP is being received, a wireless LAN switching guidance screen 71 is displayed.

On the wireless LAN switching guidance screen 71, a wireless switching confirmation information 72, a "Yes" button 73 and a "No" button 74 are displayed (see FIG. 3). The wireless switching confirmation information 72 is information indicating that a wired LAN is not connected, and an AP of a wireless LAN has been detected and the MFP 10 is in condition for using the wireless LAN. The wireless switching confirmation information 72 also includes a message asking whether the user wishes to use a wireless LAN.

When the user wishes to switch to a network connection sing the wireless LAN, the user may depress the "Yes" button 73. Then, at least the current network switching method can be switched to the wireless LAN. That is, when the user depressed the "Yes" button 73, the MFP 10 is connected to the wireless LAN corresponding to the currently detected AP, thereby the MFP 10 is in condition for using the wireless LAN. When there is an AP corresponding to a normal wireless LAN among the detected AP's, connection to the AP is prioritized. When the user depressed the "No" button 74, the screen returns to the standby screen 2.

As shown in FIG. 2B, when the second communication button 52 is included in the standby screen 2, a screen displayed when the second communication button 52 is depressed may be different depending on the connection status of the wireless LAN.

Figure 4:
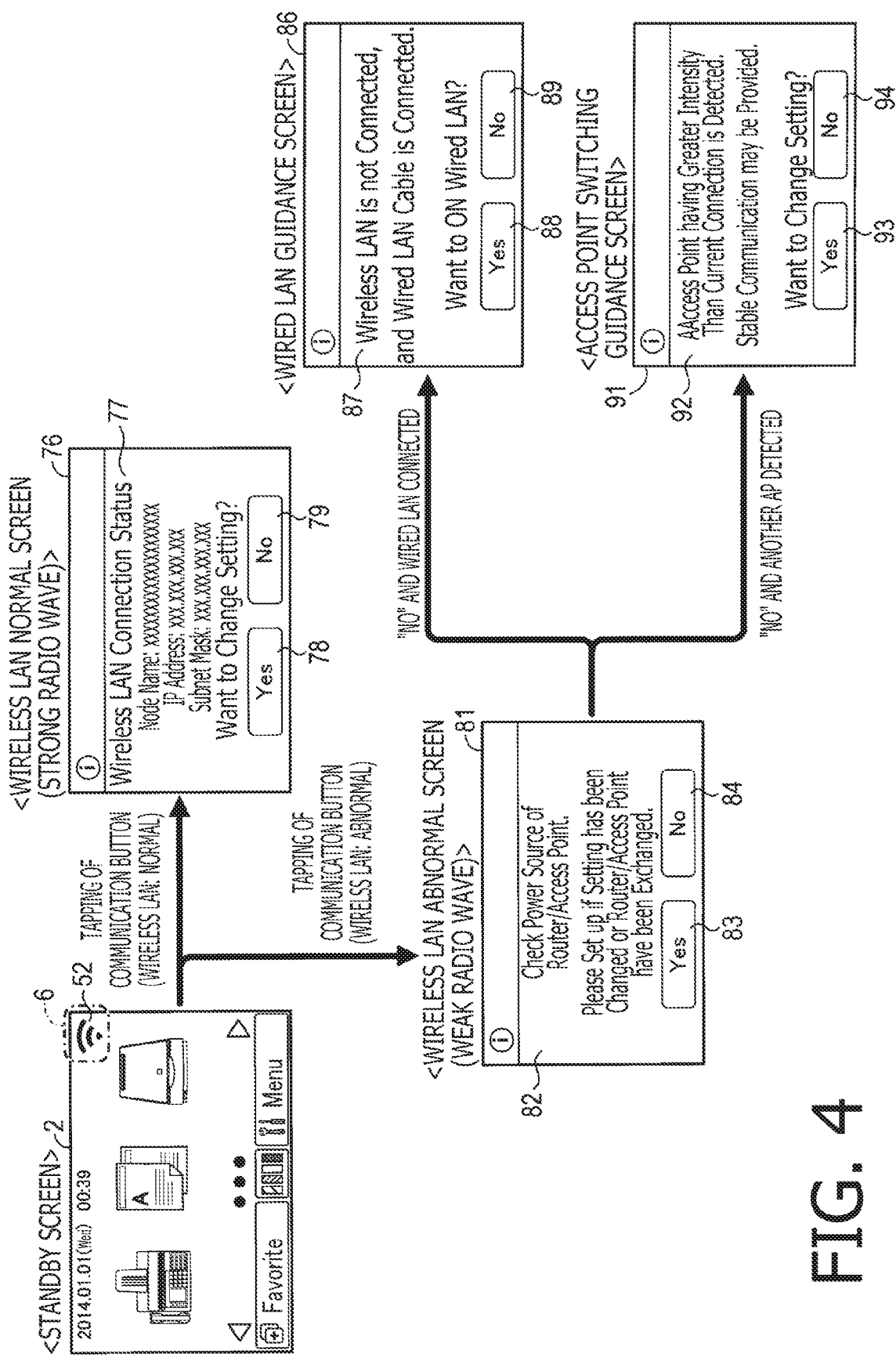
FIG. 4 illustrates a transition of the displayed screens in response to depression of the communication button when the network connection is set to a wireless LAN.

As shown in FIG. 4, when the second communication button 52 is depressed, if the connection status of the wireless LAN is normal, a wireless LAN normal screen 76 is displayed. If the connection status of the wireless LAN is abnormal, a wireless LAN abnormal screen 81 is displayed.

Whether the connection status of the wireless LAN is normal or not is determined based on the radio wave intensity of the received radio wave of the wireless LAN. For example, when the radio wave intensity is equal to or greater than a threshold level and the data communication can be executed normally, it is determined that the connection status is normal. In contrast, for example, when the radio wave intensity is less than the threshold level, there is a possibility that the data communication may not be executed normally. In such a case, it is determined that the connection status is abnormal.

In the wireless LAN normal screen 76, wireless LAN connection information 77, a "Yes" button 78, and a "No" button 79 are displayed as shown in FIG. 4. The wireless LAN connection information 77 is information relating to the currently connected wireless LAN, which includes, for example, a node name, a radio wave intensity and an IP address of the MFP 10. The wireless LAN connection information 77 also includes a message asking whether the user wishes to change the wireless LAN to another wireless LAN.

When the user wishes to user another wireless LAN which is different from the currently used wireless LAN, by depressing the "Yes" button 78, it becomes possible to proceed to set another wireless LAN. For example, when the user depresses the "Yes" button 78, the setting start screen 61 as shown in FIG. 2A is displayed. Then, uses the setting start button 61 as a starting point, the user can re-set a wireless LAN. When the "No" button 79 is depressed in the wireless LAN normal screen 76, the screen returns to the standby screen 2.

In the wireless LAN abnormal screen 81, wireless LAN abnormal information 82, a "Yes" button 83, and a "No" button 84 as shown in FIG. 4. The wireless LAN abnormal information 82 includes information indicating that the wireless LAN currently set to use is in a state that it cannot be normally used, information indicating the user to check operation status of the router 160 and AP, information to re-execute a setting of a wireless LAN when necessary, and the like. When the user wishes to re-execute the setting of the wireless LAN, by depressing the "Yes" button 83 to display the setting start screen 61 as shown in FIG. 2A, the user can re-execute the setting of the wireless LAN.

In the wireless LAN abnormal screen 81, when the "No" button 84 is depressed, different screens are displayed depending on whether the MFP 10 is currently connected to a wired LAN, or whether the MFP 10 receives a radio wave from an AP of another wireless LAN which is different from the wireless LAN currently set and used.

For example, when the MFP 10 is connected to the wired LAN, a wired LAN switching guidance screen 86 is displayed. When the MFP 10 is receiving a radio wave from the AP of another wireless LAN which is different from the wireless LAN currently set and used, an access point switching guidance screen 91 is displayed.

In the wired switching guidance screen 86, wired switching confirmation information 87, a "Yes" button 88 and a "No" button 89 are displayed. The wired switching confirmation information 87 includes information indicating that the MFP 10 is not currently connected to the set wireless LAN, and information indicating that the MFP 10 is being connected to the wired LAN. The wired switching confirmation information 87 also includes a message asking whether the user wishes to use a wired LAN.

When the user wishes to switch to a network connection using the wired LAN, by switching the "Yes" button 88, as least the current network connection method can be switched to the wired LAN. When the user depresses the "No" button 74, it is determined whether the MFP 10 is receiving a radio wave from an AP of a wireless LAN which is different from the currently set and user wireless LAN. When the MFP 10 is receiving a radio wave from the AP of the wireless LAN which is different from the currently set and used wireless LAN, an access point switching guidance screen 91 is displayed.

In the access point switching guidance screen 91, AP switching confirmation information 92, a "Yes" button 93, and a "No" button 94 are displayed. The AP switching confirmation information 92 includes information indicating that there is an AP of a wireless LAN of which radio wave intensity is stronger than that of the wireless LAN currently set, and a messing asking whether the user wishes to use the other wireless LAN of which radio wave intensity is strong.

When the user wishes to change the other wireless LAN of which radio wave intensity is stronger, by depressing the "Yes" button 93, it is possible to proceed to make a setting of the other wireless LAN. For example, when the user depresses the "Yes" button 93, the setting start screen 61 as shown in FIG. 2A is displayed. Then, the user can re-execute a setting of a wireless LAN with the setting start screen 61 being as the starting point. When the user depresses the "No" button 94 in the access point switching guidance screen 91, the screen returns to the standby screen 2.

(5) Communication Control Process

Figure 5:
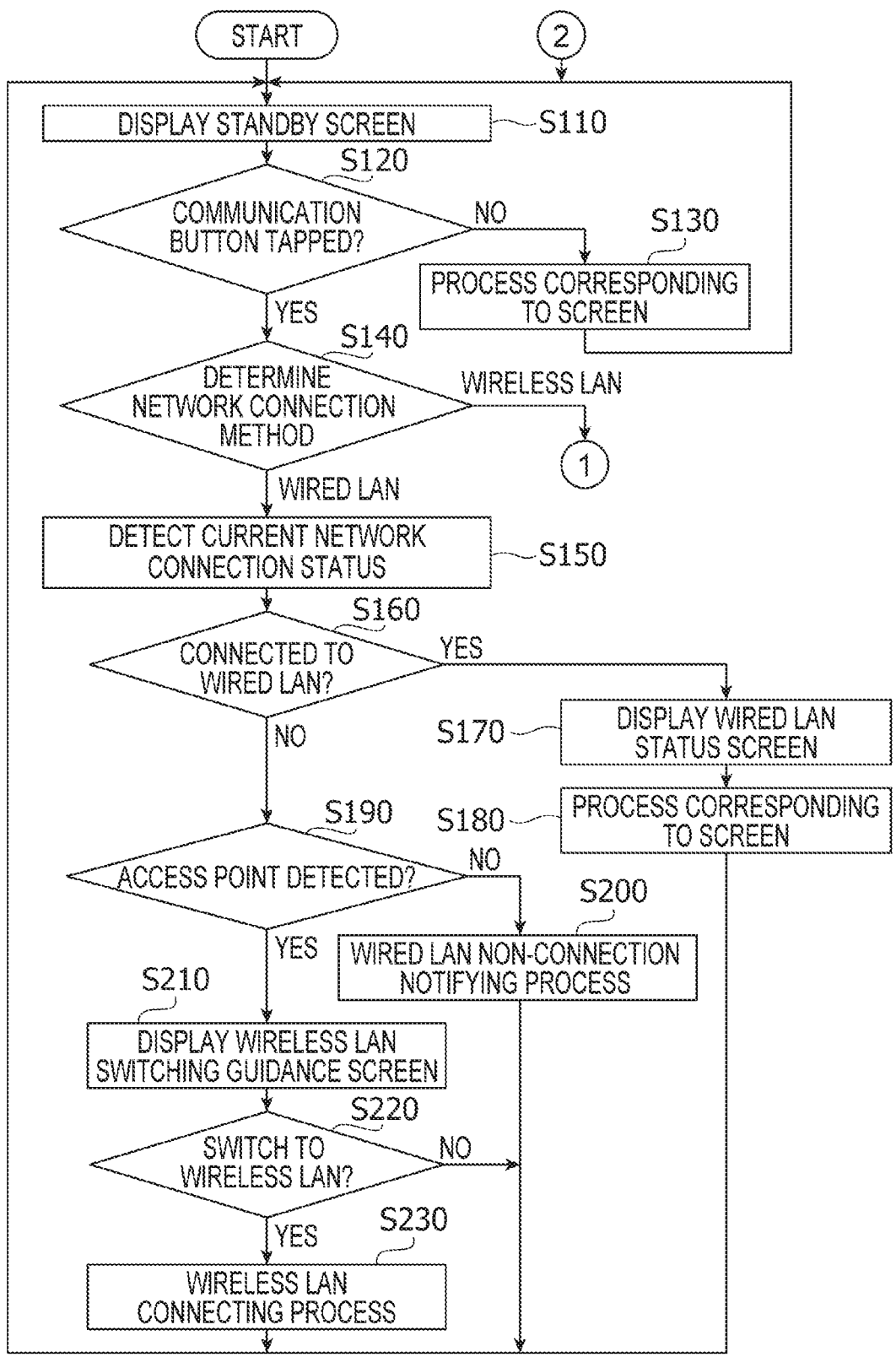
FIGS. 5-7 show a flowchart illustrating a communication control process.
Figure 6:
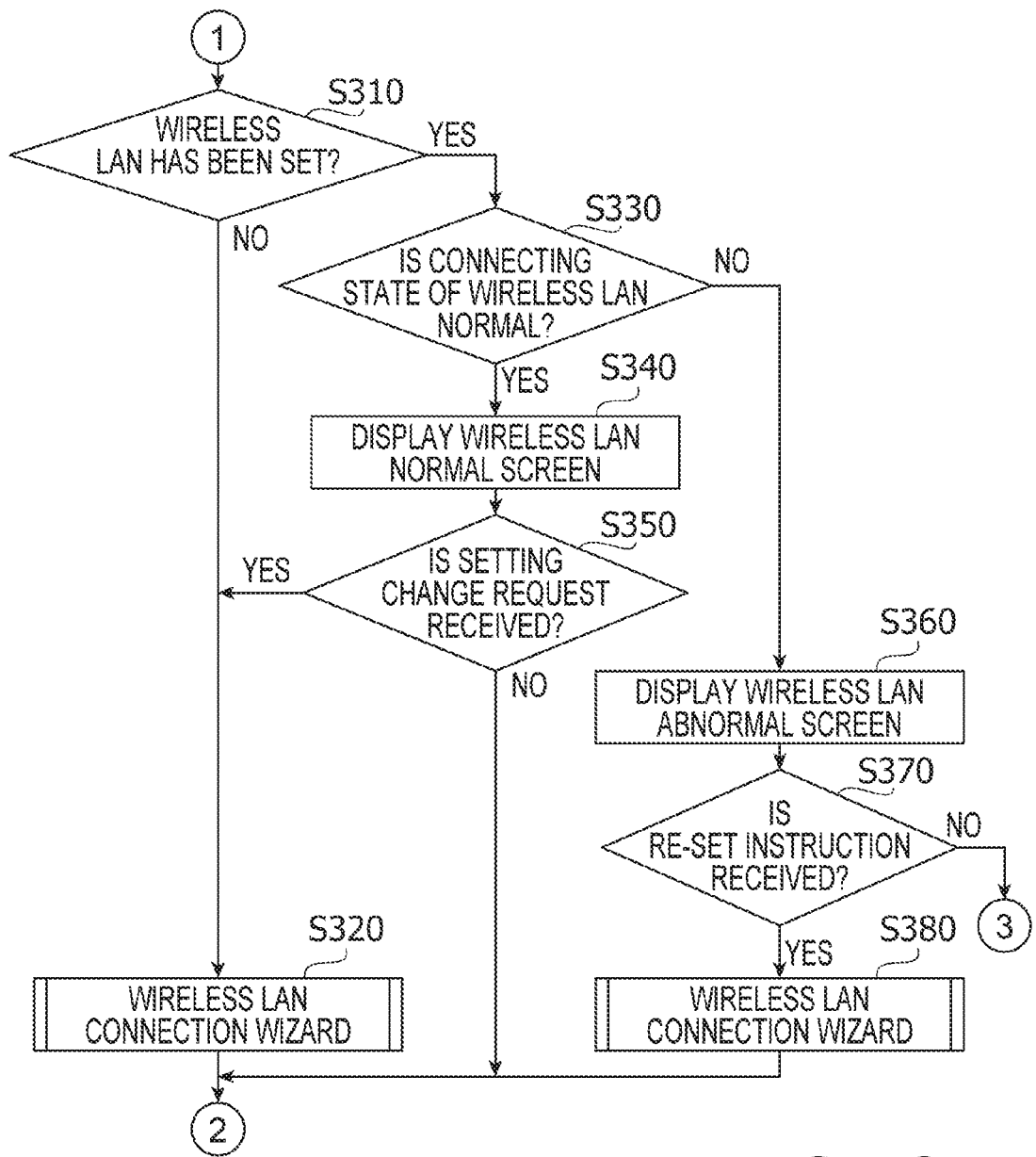
Figure 7:
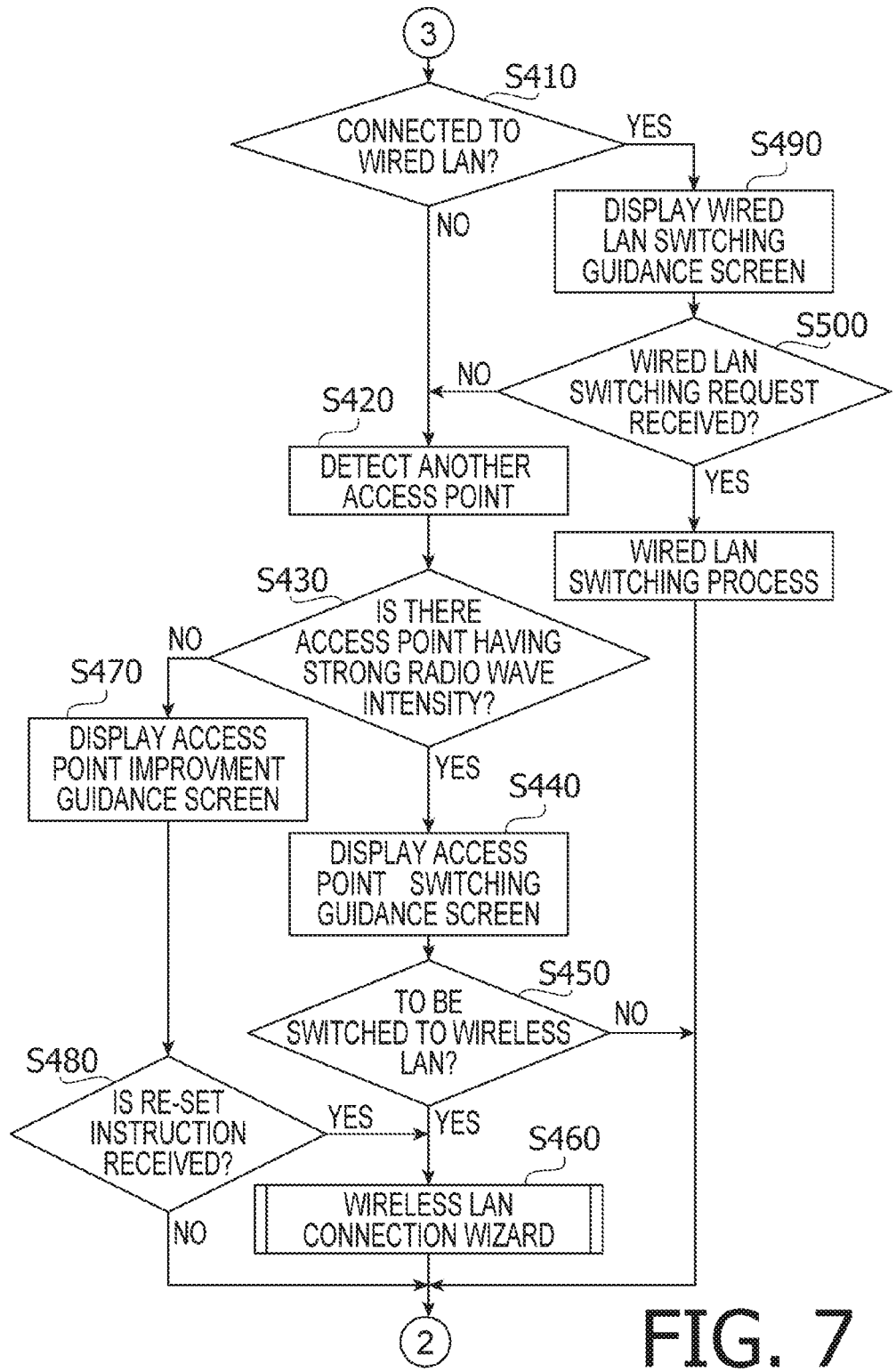

The transition of the screens described above are performed as the CPU 11 of the MFP 10 executes a communication control program stored in the ROM 12 or the NVRAM 14. FIGS. 5-7 shows an example of the communication control process. The CPU 11 of the MFP 10 retrieves the communication control program from the ROM 12 or the NVRAM 14 and executes the same after the MFP 10 is powered on.

When the communication control process is started, the CPU 11 causes the display device 18 to display a standby screen 2 (S110). In this case, within the communication status display area 6 in the standby screen 2, the communication button corresponding to the setting status and the connection status of the presently used network is displayed from among the three types of communication buttons 51, 52 and 53 shown in FIG. 2.

In S120, the CPU 11 determines whether the communication button within the standby screen 2 is depressed. When the communication button is not depressed (S120: NO), the CPU 11 executes a process corresponding to an operation other than depression of the communication button (S130), and returns to S110. It is noted that, no operations are performed with respect to the standby screen 2, no particular process is done in S130 and the CPU 11 returns to S110.

When the communication button is depressed (S120: YES), the CPU 11 determines the network connection method currently set (S140). When the wired LAN is set as the currently set network connection method, the CPU 11 proceeds to S150.

In S150, the CPU 11 detects the connection status of the current network. That is, the CPU 11 detects at least the connection status of at least the wired LAN. In S160, the CPU 11 determines whether the MFP 10 is connected to the wired LAN based on the detection result in S150. When it is determined that the MFP 10 is connected to the wired LAN (S160: YES), the CPU 11 causes the display device 18 to display a wired LAN status screen 66 (see FIG. 3). Then, in S180, the CPU 11 executes a process corresponding to the user operation with respect to the wired LAN status screen 66. After execution of S180, the CPU 11 returns to S110.

When it is determined that the MFP 10 is not connected to the wired LAN (S160: NO), the CPU 11 proceeds to S190. In S190, the CPU 11 determines whether an AP of the wireless LAN which has already been set is detected. That is, in S190, it is detected whether a radio wave having a radio wave intensity equal to or greater than the threshold is received from the AP of the wireless LAN having been set. When it is determined that the AP of the wireless LAN having been set is note received (S190: NO), the CPU 11 executes a wired LAN non-connection notifying process to notify the user that the MFP 10 cannot be connected to the wired LAN (S200), and the CPU 11 returns to S110.

When the AP of the wireless LAN having been set is detected (S190: YES), the CPU 11 proceeds to S210. In S210, the CPU 11 causes the display device 18 to display a wireless LAN switching guidance screen 71 (see FIG. 3). In S220, it is determined whether an operation (i.e., depression of "Yes" button 73) requesting to switch to the wireless LAN has been done on the wireless LAN switching guidance screen 71. When it is determined that the operation of requesting to switch to the wireless LAN has not been done (i.e., when the "No" button 74 has been depressed) (S220: NO), the CPU 11 returns to S110.

A wireless LAN connection process in S230 is a process of tentatively switching the network connection method to a connection using the wireless LAN which has already been set so that, at least the current network connection can use the wireless LAN which has already been set.

When it is determined the wireless LAN is set as the network connection method in S140, the CPU 11 proceeds to S310 (FIG. 6). In S310, it is determined whether the wireless LAN setting has already been done. When it is determined that the wireless LAN setting has not been done (S310: NO), the CPU 11 executes the wireless LAN connection wizard (S320). In this case, the setting start screen 61 (see FIG. 2A) is used as the starting point and a series of processes to perform the wireless LAN setting is executed. As the wireless LAN connection wizard is executed and the setting of the wireless LAN has completed, the CPU 11 returns to S110.

When it is determined that the wireless LAN setting has already been done (S310: YES), the CPU 11 determines whether the connection status of the wireless LAN is normal in S330. According to the illustrative embodiment, as aforementioned, whether the connection status is normal or not is determined based on the radio wave intensity of the received radio wave of the wireless LAN. When the connection status of the wireless LAN is normal, that is, when the radio wave equal to or greater than the threshold can be received from the AP of the wireless LAN set to use, and the data communication can be normally executed with the AP (S330: YES), the CPU 11 proceeds to S340.

In S340, the CPU 11 causes the display device 18 to display a wireless LAN normal screen 76 (see FIG. 4). In S350, the CPU 11 determines whether an operation to change the setting to use another wireless LAN (i.e., depression of "Yes" button 78) is done on the wireless LAN normal screen 76. When the operation to switch to another wireless LAN has not been done (i.e., when the "No" button has been depressed) (S350: NO), the CPU 11 returns to S110. When the operation of requesting to switch to another wireless LAN has been done (S350: YES), the CPU 11 executes the wireless LAN connection wizard in S320. That is, the CPU 11 displays the setting start screen 61 shown in FIG. 2A and indicates the user to perform setting of the wireless LAN. When the setting of the wireless LAN with use of the wireless LAN connection wizard has completed, the CPU 11 returns to S110.

When it is determined that the connection status of the wireless LAN is not normal, that is, the intensity of the radio wave transmitted from the AP of the wireless LAN to which the MFP 10 is set to be connected is too weak and data communication cannot be normal executed with the AP (S330: NO), the CPU 11 proceeds to S360. In S360, the CPU 11 causes the display device 18 to display the wireless LAN abnormal screen 81 (see FIG. 4).

In S370, the CPU 11 determines whether an operation to request for re-setting of the wireless LAN (i.e., depression of "Yes" button 83) on the wireless LAN abnormal screen 81 is executed or not (S370). When the operation to request for re-setting of the wireless LAN (S370: YES), the CPU 11 executes a wireless LAN connection wizard in S380. When the setting of the wireless LAN based on the wireless LAN connection wizard, the CPU 11 returns to S110.

When the user operation to request for resetting of the wireless LAN (i.e., when the "No" button 84 has been depressed) (S370: NO), the CPU 11 proceeds to S410 (FIG. 7). In S410, the CPU 11 determines whether MFP 10 is being connected to the wired LAN. When the MFP 10 is being connected to the wired LAN (S410: YES), the CPU 11 causes the display device 18 to display the wired LAN switching guidance screen 86 (see FIG. 4) in S490.

In S500, the CPU 11 determines whether a user operation requesting to switch to the wired LAN is performed on the wired LAN switching guidance screen 68 (i.e., whether the "Yes" button 88 has been depressed). When the operation requesting to switch to the wired LAN is performed (S500: YES), the CPU 11 executes a switching process to switch to the wired LAN in S510 so that the wired LAN can be used, and returns to S110.

When the operation to switch to the wired LAN has not performed (i.e., when the "No" button is depressed) (S500: NO), and when the MFP 10 is not being connected to the wired LAN (S410: NO), the CPU 11 proceeds to S420.

In S420, the CPU 11 searches existence of an AP of the wireless LAN which is different from the currently set wireless LAN. That is, the CPU 11 determines whether there exists an AP of the wireless LAN from which the radio wave having the intensity equal to or greater than the threshold is received.

In S430, the CPU 11 determines whether there exists another AP from which a radio wave having an intensity equal to or greater than the threshold is received. When there is such an AP from which the radio wave having the intensity which is equal to or greater than the threshold (S430: YES), CPU 11 causes the display device 18 to display the access point switching guidance screen (FIG. 4) in S440, and proceeds to S450.

In S450, the CPU 11 determines whether a request to switch to another wireless LAN is made on the access point switching guidance screen 91 (i.e., whether the "Yes" button 93 has been depressed). When an operation to switch to another wireless LAN has not been performed (i.e., the "No" button 94 is not depressed) (S450: NO), the CPU 11 returns to S When it is determined that an operation to switch to another wireless LAN has been performed (S450: YES), the CPU 11 executes the wireless LAN connection wizard (S460). When setting of the wireless LAN with use of the wireless connection wizard has completed, the CPU 11 returns to S110.

When the AP from which a radio wave having an intensity equal to or greater than the threshold has not been searched (S430: NO), the CPU 11 causes the display device 18 to display an access point improvement guidance (not shown) and proceeds to S480. The access point improvement guidance screen is a screen which indicates the user to improve a radio wave environment of the currently used AP and wireless LAN. In one embodiment, the access point improvement guidance screen shows a message indicating the user to switch to another wireless LAN, and a "Yes" button for the user to request to switch to another wireless LAN and a "No" button not for requesting to switch to another wireless LAN are provided. When the "Yes" button is depressed in the access point improvement guidance screen (S480: YES), the CPU 11 proceeds to S460. When the "No" button is depressed (S480: NO), the CPU 11 returns to S110.

(6) Effects of Illustrative Embodiment

As described above, in the MFP 10 according to the illustrative embodiment, the network connection method can be set in advance. That is, whether the wireless LAN is used or the wired LAN is used to execute data communication with external devices such as the PC 30 can be set in advance.

When the communication button displayed within the communication status display area 6 of the standby screen 2 is depressed, the next screen changed from the standby screen 2 is determined depending on the network connection method as set. Further, even though the wireless LAN is set as the network connection method, depending on whether the wireless LAN setting necessary to used the wireless LAN has been made or not, different screens are displayed on the display device 18. Further, when the wireless LAN setting has been made, different screens will be displayed depending on the intensity of the radio wave of the wireless LAN.

That is, provided that the wireless LAN has been set as the network connection method, when the communication button is depressed, an appropriate screen is displayed depending on whether the wireless LAN setting has been made or not. When the wireless LAN setting has been made, an appropriate screen corresponding to the radio wave environment at the time is displayed.

In particular, when the radio wave intensity of the wireless LAN is relatively weak, a connection status of the wired LAN is checked, and when the wired LAN is available, the user is indicated to switch to the wired LAN. When the wired LAN is not available, availability of another wireless LAN is checked, and when there another wireless LAN is available, the user is indicated to switch to the other wireless LAN which is detected to be available.

Thus, when the wireless LAN is set as the network connection method, necessary information can be obtained depending on the setting status of the wireless LAN and/or the radio wave environment of the wireless LAN quickly, and the user can take necessary measures depending on the current status.

When the wired LAN is set as the network connection method, transition of the screens when the communication button is depressed is different, depending on the MFP 10 is currently connected to the wired LAN. When the MFP 10 is not currently connected to the wired LAN, the screen changes to different ones depending on whether a radio wave of the wireless LAN having been set is detected or not.

Accordingly, when the wired LAN is set as the network connection method, by depressing the communication button, the user can recognize whether the wired LAN is currently available or not quickly. Further, when the wired LAN is not available, different screens are displayed depending on whether the wireless LAN is currently available, and the user can switch to the wireless LAN when it is available.

Accordingly, when the wired LAN is set as the network connection method, the used can obtain necessary information depending on the connection status of the wired LAN and/or availability of the wireless LAN, and take necessary measures depending o the current status.

It is noted that the MFP 10 is an example of a display control device and/or communicating device set forth in claims. A program corresponding to the communication control process shown in FIGS. 5-7 is an example of a display control program. The ROM 12 or the NVRAM 14 of the MFP 10 is an example of a non-transitory computer-readable medium. The PC 30 is an example of an external device set forth in the claims. The wireless communication device 19 of the MFP 10 is an example of a detecting device set forth in the claims. Further, the CPU 11 of the MFP 10 is an example of a controller set forth in the claims.

The process in S110 is an example of a button display process set forth in the claims. The process in S310 is an example of a wireless setting determining process set forth in the claims. The process in S330 is an example of an intensity obtaining process and a level determining process set forth in the claims. The process in S340 and S360 are an example of a first screen display process set forth in the claims, and the steps S420-S430 are an example of an another network determining process set forth in the claims. The process in S460 is a setting screen display process set forth in the claims. The step S460 is an example of a setting screen display process set forth in the claims. Further, the process in S410 is an example of a wired connection availability determining process. The process of setting one of the wireless LAN and the wired LAN as the network connection method is an example of a connection method setting process. The process of executing the data communication using one of the wired LAN and the wireless LAN set as the network connection method is an example of a communicating process set forth in the claims. The process in S160 is an example of the wired connection availability determining process set forth in the claims.

OTHER EMBODIMENTS

It is noted that aspects of the disclosures need not be limited to the above-described illustrative embodiment, and various modifications can be realized as indicated below.

(1) Contents of each of screens shown in FIGS. 2A, 2B, 2C, 3 and 4 are only examples. Concrete contents of each screen may be determined arbitrarily as long as appropriate information can be presented depending on the network setting status and/or the network connection status. That is, appropriate screens corresponding to the settings of the network connection method, availability of the wireless LAN setting and/or the radio wave intensity of the wireless LAN setting can be determined arbitrarily.

(2) According to the illustrative embodiment, the target of the determining process in S190 is an AP of the wireless LAN having been set. When the wireless LAN setting has not been made at all, the target in S190 may be expanded to all AP's of which radio waves can be received. That is, when the wireless LAN setting has not been done, the CPU 11 may determine whether there exists an AP from which the radio wave of which intensity is equal to or greater than the threshold is received.

When it is determined that there exists an AP from which the radio wave of which intensity is equal to or greater than the threshold is received, the CPU 11 may cause the display device 18 to display AP information in S210, and may indicate the user to perform the wireless LAN setting using the AP. Further, when the user requests setting or the wireless LAN using the AP (S220: YES), the CPU 11 may executes a new wireless setting as the wireless LAN connection process of S230. For example, the CPU 11 may display the setting start screen 61 as shown in FIG. 2A and executes the wireless LAN connection wizard in such a modification.

(3) When the intensity of the received radio wave of a particular wireless communication network is less than a particular level, which of the wired communication and the wireless communication through another wireless communication network is to be indicated to the user can be determined arbitrarily. For example, one of the above may be indicated to the user, or both are presented and the user may be indicated to select one of them.

(4) It is noted that, in the communication controlling process shown in FIG. 5, an execution order of S160 and S190 can be exchanged. That is, the detection of AP (S190) may be executed first, and S160 may be executed when the AP is not detected in S190.

It is also noted that an execution order of S410 and S420-S480 can be exchanged. That is, the process may be modified such that S420-S480 are executed before S410 is executed, and when a decision in S450 is negative or a decision in S480 is negative, S410 is executed.

(5) The MFP 10 according to the illustrative embodiment may be modified such that a single component executing a single function or multiple functions may be divided into multiple components. Further, the illustrative embodiment may be modified such that multiple components executing a single function or multiple function may be integrated into one component. Further, at least a part of the configuration of the MFP 10 according to the illustrative embodiment may be substituted by a well-known component having the same function. Further, a part of the configuration of the above-described illustrative embodiment may be omitted, and at least a part of the above-described configuration may be replaced with a component or components of another device. It is noted that any aspects included in technical ideas defined only by the claims should be regarded as embodiments according to the present disclosures.

What is claimed is:

1. A display control device, comprising:
  a wireless communication interface configured to:
    execute a wireless communication with an external device; and
    detect an intensity of a radio wave received by the wireless communication interface;
  a display;
  a user interface configured to output a selection signal to identify a part of an image displayed on the display based on a user's operation to the user interface; and
  a controller,
  wherein the controller is configured to execute:
    displaying a single communication button image in a particular position of the display, on a standby screen displayed on the display;
    determining whether setting information necessary to execute the wireless communication through a particular communication wireless network using a particular channel has been set;
    changing a display mode of the single communication button image, while displaying the single communication button in the particular position, based on whether the setting information has been set; and
  wherein the controller is configured to automatically switch, according to a screen transition process, a screen displayed on the display between a normal state screen, a channel switching screen, and a particular setting screen based on at least one of the intensity of the radio wave and the setting information, the normal state screen indicating that the wireless communication through the particular communication wireless network can be executed normally, the channel switching screen indicating another particular communication wireless network using a different channel different from the particular channel,
  wherein, in the screen transition process, the controller executes:
  determining whether the setting information has been set,
  when it is determined that the setting information has been set:
    obtaining the intensity of the radio wave detected by the wireless communication interface; and
    determining whether the obtained intensity of the radio wave is equal to or greater that a particular level;
  when it is determined that the intensity of the radio wave is less than the particular level,
    determining whether there exists the other particular communication wireless network using a different channel different from the particular channel and having the intensity of the radio wave equal to or greater than the particular level; and
    when determining that there exists the other particular communication wireless network, displaying, on the display, the channel switching screen, and
  when it is determined that the intensity of the radio wave is equal to or greater than the particular level, displaying, on the display, the normal state screen, without determining whether there exists the other particular communication wireless network; and
  when it is determined that the setting information has not been set, the controller executes displaying the particular setting screen on the display.

2. The display control device according to claim 1, wherein the controller executes setting the setting information necessary for the wireless communication through the particular wireless communication network using the particular channel.

3. The display control device according to claim 1, wherein the controller is further configured to execute determining whether a wireless communication through another particular wireless communication network at a different channel is available when it is determined that the radio wave intensity is less than the particular level, and
wherein the controller is configured to display the channel switching screen indicating the particular wireless communication network of which wireless communication is determined to be available when it is determined that the radio wave intensity is determined to be less than the particular level.

4. The display control device according to claim 1, wherein the controller is further configured to execute displaying a wireless setting screen to receive the setting information necessary to execute a wireless communication through the another particular wireless network on the channel switching screen in response to receiving, from the user interface, a particular channel switching signal indicating executing to a wireless communication through the another particular wireless network.

5. The display control device according to claim 1, further comprising a wired communication device capable of executing a wired communication with an external device,
wherein the controller is further configured to execute determining whether a wired communication through the wired communication device is available when it is determined that the radio wave intensity is less than the particular level, and
wherein the controller is configured to display a wired communication notifying screen indicating that the wired communication through the wired communication device is available when it is determined that the wired communication is available.

6. The display control device according to claim 1, further comprising a wired communication device capable of executing a wired communication with an external device,
wherein the controller is further configured to execute:
setting which one of the wireless communication through the wireless communication device and the wired communication through the wired communication device is used for a communication with the external device;
communicating through the external device using one of the wireless communication through the wireless communication device and the wired communication through the wired communication device set; and
communicating through the external device using the wireless communication in response to receiving, from the user interface, the particular selection signal to identify the communication button image and further setting the wireless communication.

7. The display control device according to claim 6, wherein the controller is configured to:
execute determining whether a wired communication through the wired communication device is available when the wired communication is set in response to receiving, from the user interface, the particular selection signal to identify the communication button image, which is one of the particular button images displayed on the display, and
displaying a wireless connection switching screen including at least one of a message indicating that the wired communication cannot be executed and a message indicating the user to switch to the wireless communication through the wireless communication device when it is determined that the wired communication through the wired communication device is not available.

8. A display control method to be used in a communication device which comprises a wireless communication interface configured to execute a wireless communication with an external device and detect an intensity of a radio wave received by the wireless communication interface, a display, a controller, and device user interface configured to output a selection signal to identify a part of an image displayed on the display based on a user's operation to the user interface:

the method includes:
a button display step to display a single communication button image in a particular position of the display, on a standby screen displayed on the display;
a setting information step to determine whether setting information necessary to execute the wireless communication through a particular communication wireless network using a particular channel has been set;
a step of changing a display mode of the single communication button image, while displaying the single communication button in the particular position, based on whether the setting information has been set; and
a wireless setting determination step, wherein the controller is configured to automatically switch, according to a screen transition process, a screen displayed on the display between a normal state screen, a channel switching screen, and a particular setting screen based on at Last one of the intensity of the radio wave and the setting information, the normal state screen indicating that the wireless communication through the particular communication wireless network can be executed normally, the channel switching screen indicating an other particular communication wireless network using a different channel different from the particular channel,
wherein, in the screen transition process, the controller executes:
determining whether the setting information has been set, when it is determined that the setting information has been set:
an intensity obtaining step to obtain the intensity of the radio wave detected by the wireless communication interface; and
a level determining step to determine whether the obtained intensity of the radio wave is equal to or greater that a particular level;
when it is determined that the intensity of the radio wave is less than the particular level,
determining whether there exists the other particular communication wireless network using a different channel different from the particular channel and having the intensity of the radio wave equal to or greater than the particular level; and
when determining that there exists the other particular communication wireless network, a second displaying step to display, on the display, the channel switching screen, and
when it is determined that the intensity of the radio wave is equal to or greater than the particular level, displaying, on the display, the normal state screen, without determining whether there exists the other particular communication wireless network; and
when it is determined, in the wireless setting determination step, that the setting information has not been set, the method executes a second screen display step to display the particular setting screen on the display.

9. A non-transitory computer-readable medium of a communication device which comprises a wireless communication interface configured to execute a wireless communication with an external device and detect an intensity of a radio wave received by the wireless communication interface, a display, user interface configured to output a selection signal to identify a part of an image displayed on the display based on a user's operation to the user interface, and a controller,
the non-transitory computer-readable medium storing instructions which, when executed by the controller, causes the communication device to execute:

displaying a single communication button image in a particular position of the display, on a standby screen displayed on the display;

determining whether setting information necessary to execute the wireless communication through a particular communication wireless network using a particular channel has been set;

changing a display mode of the single communication button image, while displaying the single communication button in the particular position, based on whether the setting information has been set; and wherein the controller is configured to automatically switch, according to a screen transition process, a screen displayed on the display between a normal state screen, a channel switching screen, and a particular setting screen based on at least one of the intensity of the radio wave and the setting information, the normal state screen indicating that the wireless communication through the particular communication wireless network can be executed normally, the channel switching screen indicating an other particular communication wireless network using a different channel different from the particular channel, wherein, in the screen transition process, the controller executes:

determining whether the setting information has been set, when it is determined that the setting information has been set:
   obtaining the intensity of the radio wave detected by the wireless communication interface; and
   determining whether the obtained intensity of the radio wave is equal to or greater that a particular level;

when it is determined that the intensity of the radio wave is less than the particular level,
   determining whether there exists the other particular communication wireless network using a different channel different from the particular channel and having the intensity of the radio wave equal to or greater than the particular level; and when determining that there exists the other particular communication wireless network, displaying, on the display, the channel switching screen, and when it is determined that the intensity of the radio wave is equal to or greater than the particular level, displaying, on the display, the normal state screen, without determining whether there exists the other particular communication wireless network; and when it is determined that the setting information has not been set, the controller executes displaying the particular setting screen on the display.

* * * * *